Patented Feb. 28, 1939

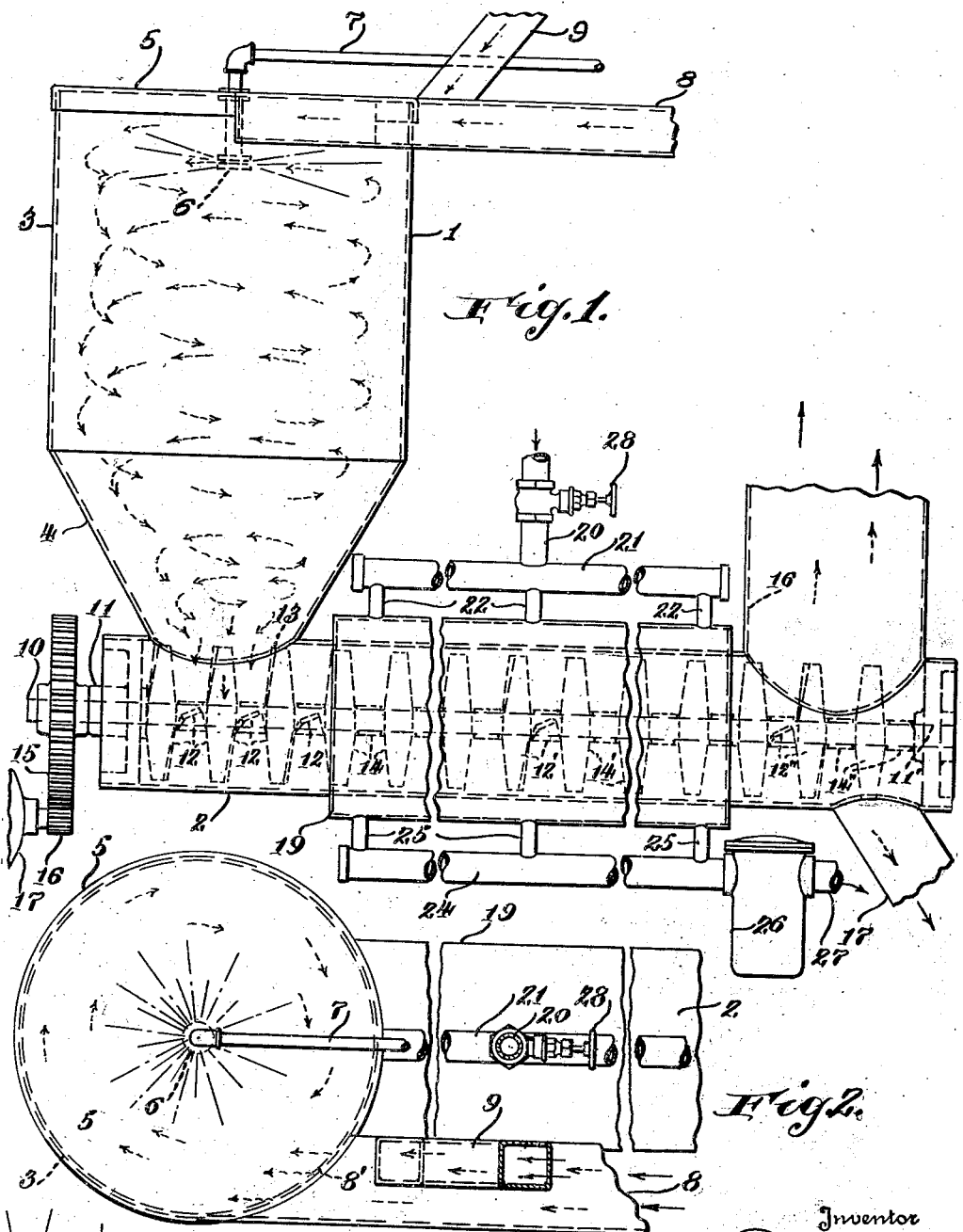

2,148,998

UNITED STATES PATENT OFFICE 2,148,998

MIXING AND DRYING APPARATUS

Augustus J. Sackett, Anne Arundel County, Md.

Application January 27, 1937, Serial No. 122,561

6 Claims. (Cl. 259—4)

The invention relates to the continuous mixing of atomized sulphuric acid and finely divided phosphate rock, effecting the chemical combination of the acid and phosphate mainly while the particles are in suspension, the product which is super-phosphate being continuously discharged from the apparatus during its operation.

The apparatus, which is capable of various mixing operations in the production of chemical and other combinations, has the important advantage in the acidulation of phosphate rock in addition to continuity of operation and automatic feeding and discharge that the product is of uniform proportions, completely mixed, and almost completely combined in a chemical sense, requiring but a short period of seasoning for use as fertilizer and if it is to be ammoniated being ready for immediate treatment for this purpose, and the method is also to be applied to ammoniation.

The apparatus of the prior art so far as it is intended for the combination of acid and phosphate rock consists mainly of bath mixers which are operated at great expense of time and labor in weighing and handling the materials for each batch and are less efficient, in that the ingredients are incompletely combined and not uniformly mixed and require several weeks seasoning after mixing before use as fertilizer, if they are to be used as super-phosphate and a considerable period of seasoning before ammoniation if they are to be treated in this manner; whereas the product of the present apparatus as discharged therefrom may be used as super-phosphate fertilizer after six or eight days' seasoning and may be ammoniated immediately after it is discharged from this apparatus.

In the operation of the old batch mixers, the materials are mixed in a rotary pan having mechanical stirrers and is released in a hot den where they are heated by the chemical action of the materials, the heating effect on account of the varying thickness of the material being entirely lacking in uniformity.

In the apparatus of the invention, the materials are uniformly heated by continuous projection against the walls of a heated drum being initially heated by the heat due to chemical combination. The heating by chemical action is likewise uniform due to complete contact of the particles of rock and acid in the first drum.

It is also an important advantage of the improved apparatus in its preferred operation that the product as delivered is in granular form and so nearly dried that it is non-adhesive retaining a little surplus acid which is of advantage in ammoniation as the surplus acid assists in the combination of the material with ammonia and prevents the discharge of free ammonia gas with the product, which discharge would be highly objectionable in the plant as it would be inconvenient if not harmful to the workmen in the vicinity. By the improved apparatus the superphosphate discharged may be so controlled as to be delivered in granular form and non-adhesive condition preventing the solidifying of the product into lumps which must be broken either for ammoniation or for the use of the super-phosphate product directly as fertilizer.

In the accompanying drawing, I have illustrated an apparatus embodying the features of the invention so far as they relate to the apparatus in the preferred form, this apparatus is also capable of performing the process or method of the invention.

In the drawing:

Figure 1 is a side elevation of the apparatus, certain parts being broken away to reduce the dimensions of the apparatus for the purposes of illustration.

Figure 2 is a top plan view showing the apparatus shown fragmentarily and being broken away intermediately for convenience of illustration.

Referring to the drawing by numerals, each of which is used to indicate the same or similar parts in the figures, the apparatus as shown comprises a primary air draft suspension mixing drum 1, and a secondary beating and conveying drum 2.

The primary drum 1 which may be of any desired form, being preferably of circular cross section and upright, is shown as having an upper cylindrical portion 3 and a lower funnel shaped or inverted frustoconical portion 4, joined to the forward end of the beating and conveying drum to deliver thereto preferably from the top side, the arrangement of the primary drum being capable of considerable variation.

The primary suspension mixing drum 1 is shown as closed at the top by a suitable cover 5 of any desired form and it is provided at its upper end near the center with an atomizing nozzle 6 which is fed with sulphuric acid under pressure by way of an acid feed pipe 7 which is connected to the nozzle. This nozzle in the preferred form is arranged to project the acid outwardly toward the walls of the drum in radial directions preferably near the horizontal plane of the nozzle. The primary air draft suspension mixing drum 1 is also provided with an air feed passage 8 which enters the drum near the top in a tangential direction. By way of this air passage, air is fed to the drum 1 at high velocity at any suitable pressure, satisfactory results being obtained at a pressure of about one pound above atmosphere or any higher pressure which does not give too great velocity in the discharge. The primary drum 1 is also provided at the top with a downwardly disposed feed passage 9 for feeding the solid particles of phosphate rock to the air draft or stream. This preferably enters the air passage 8 near the point where it discharges at 0' into the primary drum being shown as inclined downwardly in the direction of the air draft to give the solid material an initial impulse in the tangential direction in which the air draft enters the drum. The cover 5 is made removable to give access to the inside of the drum for cleaning and repairing the drum and for other purposes.

The secondary drum 2 is shown as located with its axis horizontally disposed and connected thereto at its forward or infeed end so that the materials and air are received into the secondary drum at one end to be helically distributed and advanced therethrough and discharged therefrom at the other end as hereinafter described. It may however be otherwise arranged being capable of wide variation.

The secondary or beating drum is shown as provided with a longitudinal shaft 10 which has bearings 11 and 11' at the opposite ends of the drum. To this shaft are secured, helically arranged, conveyor blades 12 and other beater blades 14 shown in broken lines therein. The shaft is driven in rotation at suitable speeds by means of a toothed gear 15 secured thereto which gear 15 is in turn driven by a pinion 16 which meshes with the gear 15 and is secured to the shaft of an electric motor 17, it being understood that the manner of driving the shaft 10, the provision of one or more shafts and the exact details of form and arrangement are given merely for the purpose of disclosing an operative apparatus embodying the invention and may be widely varied without departure from the spirit of the invention.

The conveyor blades 12 referred to are suitably inclined to the direction of rotation which in the form shown is clockwise as seen from the left in Fig. 1 to advance the material from left to right, the conveyor blades 12 and the beater blades 14 being suitably arranged and spaced to advance the material continuously through the secondary drum from left to right, keeping the space beneath the primary drum sufficiently clear to admit the materials freely from the latter as they drop therefrom after completing the circulation and mixing by suspension therein as hereinafter described. To this end the blades 12 beneath the opening 13 from the primary drum 1 to the secondary drum 2 are shown as all in the form of conveyor blades inclined as described, there being beneath the primary drum in the form shown 6 of said conveyor blades each arranged diametrically or substantially so. Immediately beyond these blades which are indicated by reference character 12, there are, in the form of apparatus shown, six or more of the beater blades 14, following which to the right there are two conveyor blades 12' diametrically arranged, following which to the right or in the direction of feed there are seven or more beater blades 14' diametrically arranged as aforesaid, and beyond these to the right are two conveyor blades 12", and at the extreme end of the apparatus the drawing shows three beater blades 14", it being understood that the apparatus being broken away intermediately through the sets of beater blades 14 and 14' an indefinite length of drum and an indefinite number of these blades is intended to be indicated.

In the vicinity of the third set of beater blades 14" and the third set of conveyor blades 12", the drawing shows an upwardly disposed air draft discharge pipe 16 which may lead to a stack or a separating apparatus or any suitable point of discharge and there is beneath the beater blades 14" a downwardly disposed discharge pipe 17 for the super-phosphate or other mixture or compound produced by the apparatus. The pipe 16 acts as a release for air pressure and an exhaust for the acid fumes.

The discharged material moves outwardly in a continuous stream during the entire operation of the apparatus, the product discharged when the ingredients named are used being super-phosphate in proportions determined by the ingredients fed, i.e. the strength of the acid and the grade of the rock, the preferred proportions being 50–50, i. e. a pound of acid to a pound of rock.

A provision of the apparatus for the purpose of drying and granulating the product and completing the combination of acid and phosphate is found in the steam jacket or other heating element indicated by reference character 19. This jacket as shown and preferably, encloses the entire central portion of the secondary drum from the primary drum discharge opening 13 to or nearly to the air discharge pipe or stack 16. This in the form shown is supplied with steam from any suitable source by way of a steam main 20 which is suitably connected to a manifold 21 which is in turn connected to the jacket 19 at various points by suitable short pipes 22 as illustrated. The condensed steam or relatively wet steam is discharged at the bottom by way of discharge manifold 24 which is likewise connected by multiple connections 25 to the drum 19. This discharge manifold 24 is shown as provided with a separator or trap 26 for the separation of water and an exhaust pipe 27 which leads from the trap to any suitable receptacle as a feed water heater or to the outside air.

The steam supply pipe 20 is shown as controlled by hand throttle 28 or in any suitable manner by which the supply of steam and hence the temperature of the steam jacket and the temperature at which the materials are treated may be controlled.

In the operation of the apparatus and in the practice of the applicant's process, acid under pressure fed by way of the pipe 7 is discharged radially or otherwise from the atomizer nozzle 6 toward the periphery of the drum 1. At the same time air is projected into the drum 1 at the top in a tangential direction, or otherwise projected in such a manner as to produce a helical or equivalent circulation of the air, the downward component being proportionate to the speed and volume of the air introduced at the top and discharged at the bottom by way of the opening 13 leading from the bottom of the primary drum 1 into the secondary drum 2. Finely divided phosphate rock is at the same time fed by way of the feed passage 9 into the air draft passage 8 or otherwise into the air draft near the point of its entrance into the primary drum 1. A satisfactory form of phosphate rock to be introduced in this way is 90% fine through an 80 mesh wire screen, the sulphuric acid and phosphate rock being of the strength and grade commonly used in the production of super-phosphate or otherwise as may be selected for this purpose.

The air draft moving at relatively high speeds as it enters the primary drum 1 is deflected about the periphery of the drum and moves with a whirling motion substantially as indicated, the downward incline of the path, giving it a helical arrangement, being determined by the entrance of new air and the discharge of air and suspended material from the opening 13 at the bottom hence by the speed of the air and the relative cross section of the openings. The action of the air draft as described holds in suspension the atomized particles of acid, it being understood that the nozzle preferably has the effect of not only projecting the acid but of dividing it into extremely fine globules, and the particles of phosphate rock which are preferably of substantially the fineness described or any degree of fineness found suitable are likewise suspended and both sets of particles of both materials, carried by the air draft, as it circulates about the primary drum, are brought completely into mutual contact and thoroughly mixed as they move along the path described, there being a further mixing action by contact of the particles with the walls of the drum which having the deflecting effect described are contacted by the air and the particles throughout the length of the path of circulation in this drum. As a result of this action there is a high percentage of chemical combination of the acid with the phosphate and a considerable resulting heating effect due to this chemical combination. This further assists the combination of the material, each particle of rock being in intimate contact with particles of acid.

The mixed and combined materials as they enter the secondary drum are, as the result of the action of the acid in its permanently liquid form, in which it contains a variable percentage of water, in a near liquid condition. For this reason, the operation in the lower beater may be referred to as puddling as this apparatus operates upon a material which in the first instance, i. e. at the feed end of the secondary drum as shown, is liquid or near liquid being gradually dried by vaporization as it advances to the right due not only to heating but to further chemical combination and absorption of acid by the phosphate.

The operation of the conveyor beaters maintains a continuous progress of the material from left to right, or in the direction of feed and the conveyor blades have to some degree and the beater blades to a still greater degree the effect of circulating the materials in a peripheral direction and keeping them in close contact with the walls of the drum which are heated to drying temperatures by the steam in the jacket 19 or from any heating agency the material being initially heated to a considerable degree as already pointed out by chemical combination in the primary drum.

It must be understood in this connection that the drum 2, may be of any suitable length to give substantially complete chemical combination between the ingredients introduced, i. e. the acid and the phosphate and also of sufficient length and sufficiently heated to give the desired degree of drying and granulation at the rate of feed maintained by the conveyors 12, it being understood that the beaters 14 as shown have no conveying action but merely maintain the material in contact with the heated walls of the drum as it advances.

The product which is continuously delivered, the materials being continuously fed at the feed end of the apparatus is super-phosphate in proportions determined by the ingredients used and it also contains a small quantity of sulphuric acid in a free state which keeps the product slightly moist though it does not interfere with granulation, the granulation being a desirable condition in that it prevents caking of the product so that it is ready for use with a short period of seasoning as a super-phosphate fertilizer and it is also ready for immediate ammoniation, large portions of the product being utilized in this way. The ingredients are usually fed in equal proportions by weight.

I have thus described an apparatus embodying my invention so far as it relates to the apparatus and a method of operating the same in accordance with the method of my invention, the description being specific and in detail in order that the manner of applying, operating and using the invention may be fully understood, however, the specific terms herein are used in a descriptive rather than in a limiting sense, the scope of the invention being defined in the claims.

What I claim as new and desire to secure by Letters Patent is:

1. In a machine for the continuous mixing of acid and comminuted phosphate rock and for similar purposes, a primary drum located with its axis substantially upright, a spray nozzle therein adjacent the top center provided with means for discharging the acid outwardly in a plurality of substantially radial directions, means for supply acid to the nozzle, means for introducing a relatively large volume of air and directing it tangentially of said drum about said nozzle, and means for introducing the comminuted material into said air draft prior to its entrance into said drum, all said operations being continuous, whereby the air is deflected by the walls of the drum and circulated on a helical path carrying therewith in suspension the comminuted solid particles and the acid spray which are progressively mixed and combined in said drum as they advance, the drum having at the bottom a relatively large discharge opening for the air and the mixed materials, which discharge provides the vertical component of said helical path.

2. In a machine for the continuous mixing of acid and comminuted phosphate rock and for similar purposes, a primary drum, a spray nozzle therein with means for projecting the acid outwardly in a plurality of substantially radial directions, means for supplying acid to the nozzle means for introducing a relatively large volume of air and directing it tangentially of said drum near said nozzle, and means for introducing the comminuted material into said air draft to be included in and projected forwardly in a substantially tangential direction by said air draft, all said operations being continuous, whereby the air is deflected by the walls of the drum and circulated on a helical path carrying therewith in suspension the comminuted solid particles and the acid spray which are progressively mixed and combined in said drum as they advance the drum having a discharge opening for the air and the mixed materials which discharge provides the axial component of said helical path, and a secondary drum connected to said discharge to receive the materials therefrom said secondary drum having mixing and conveying beaters therein for circulating and mixing said materials and advancing them continuously, said secondary drum having a discharge for said materials spaced from the primary drum discharge opening in the direction of feed with means for separately discharging the air.

3. In a machine for the continuous mixing of acid and comminuted phosphate rock and for similar purposes, a primary drum, a spray nozzle therein provided with means for projecting and distributing the acid outwardly in a plurality of substantially radial directions, means for supplying acid to the nozzle means for introducing a relatively large volume of air and directing it tangentially of said drum near said nozzle, and means for introducing the comminuted material into said air draft, all said operations being continuous, whereby the air is deflected by the walls of the drum and circulated on a substantially helical path carrying therewith in suspension the comminuted solid particles and the acid spray which are progressively mixed and combined in said drum as they advance, the drum having a discharge opening for the air and the mixed materials, which discharge provides the axial component of said helical path, and a secondary drum connected to said discharge to receive the materials therefrom, said secondary drum having mixing and conveying beating means therein for further circulating and mixing said materials and advancing them continuously, said secondary drum having a discharge for said materials spaced from the discharge of the primary drum in the direction of feed and means for separating the air from the said materials, said secondary drum also having a heating jacket for heating the walls of the drum adjacent said beating means which serve to not only advance the material but to maintain it in contact with the walls of the drum which are heated from said jacket.

4. A machine for the continuous mixing of solid comminuted material and reagent comprising a mixing drum, an atomizing nozzle therein having openings directing the reagent outwardly toward the walls of the drum means for maintaining a continuous supply of reagent to the nozzle, means for providing a continuous air draft transversely of the drum, means for continuously introducing comminuted material into said air draft whereby the reagent and comminuted material are suspended in said air draft and thoroughly mixed as they advance and while suspended the air draft being continuously deflected from the walls of the drum and progressively advanced, the drum having a discharge opening for said air draft and materials spaced away from the path of the entering air draft in a direction transverse to said air draft providing a transverse component to the path of the draft and a second drum in which said first drum discharges, said second drum having means for heating the walls thereof and means for beating the material against said walls and continuously advancing it to a point of discharge means for separating the air from the material.

5. A machine for the continuous mixing of solid comminuted material and acid comprising a mixing drum, an atomizing nozzle therein having openings directing the acid outwardly toward the walls of the drum, means for maintaining a continuous supply of acid to the nozzle means for providing a continuous air draft transversely of the drum and directed toward a wall thereof, means for continuously introducing comminuted material into said air draft whereby the acid and comminuted material are suspended in said air draft and thoroughly mixed as they advance and while suspended, the air draft being continuously deflected from the walls of the drum and progressively advanced, the drum having a discharge opening for said air draft and materials spaced away from the path of the entering air draft in a direction transverse to said air draft providing a transverse component to the path of the draft and means for collecting the mixed materials and separately releasing the air, and means for beating and drying and comminuting said materials prior to said release.

6. In a machine for the continuous mixing of acid and comminuted phosphate rock and for similar purposes a primary drum located with its axis substantially upright, a spray nozzle therein near the top center provided with means for supplying acid thereto and orifices for projecting the acid outwardly in a plurality of substantially horizontal radial directions, means for supplying acid to the nozzle under pressure, means for introducing a relatively large volume of air and directing it tangentially in said drum about said nozzle, and means for introducing the comminuted material into said air draft, all said operations being continuous, whereby the air is deflected by the walls of the drum and circulated on a helical path carrying therewith in suspension the comminuted solid particles and the acid spray which are progressively mixed and combined in said drum as they advance, the drum having at the bottom a discharge opening for the air and the mixed materials, which discharge provides the vertical component in said helical path, a horizontal conveyor having one end positioned beneath the said drum discharge opening and adapted to receive the said material from the drum, means associated with said conveyor for beating and drying the said material as it is conveyed, and means adjacent the opposite end thereof for discharging separately the said air and mixed material.

AUGUSTUS J. SACKETT.